United States Patent
Yamada (10) Patent No.: US 8,167,439 B2
(45) Date of Patent: May 1, 2012

(54) IMAGE FORMING DEVICE

(75) Inventor: Hideaki Yamada, Nagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 351 days.

(21) Appl. No.: 12/411,069

(22) Filed: Mar. 25, 2009

(65) Prior Publication Data

US 2009/0180040 A1 Jul. 16, 2009

Related U.S. Application Data

(63) Continuation-in-part of application No. PCT/JP2007/068110, filed on Sep. 19, 2007.

(30) Foreign Application Priority Data

Sep. 26, 2006 (JP) .................................. 2006-261404

(51) Int. Cl.
*G03B 21/14* (2006.01)
(52) U.S. Cl. ............. 353/85; 348/771; 348/743; 353/31
(58) Field of Classification Search .................... 353/84, 353/85, 94, 31; 348/742, 743, 771; 359/290, 359/291, 292
See application file for complete search history.

(56) References Cited

U.S. PATENT DOCUMENTS

| | | | | |
|---|---|---|---|---|
| 6,115,016 A * | 9/2000 | Yoshihara et al. | ............... | 345/88 |
| 6,885,428 B2 * | 4/2005 | Hibi et al. | ...................... | 352/198 |
| 6,984,040 B2 * | 1/2006 | Childers | .......................... | 353/30 |
| 7,042,527 B2 * | 5/2006 | Imai | .............................. | 348/742 |
| 7,046,221 B1 * | 5/2006 | Malzbender | .................... | 345/82 |
| 7,408,527 B2 * | 8/2008 | Slobodin | ......................... | 345/32 |
| 7,517,093 B2 * | 4/2009 | Nakagawa et al. | ............. | 353/85 |
| 7,607,784 B2 * | 10/2009 | Shimaoka et al. | ............. | 353/85 |
| 2002/0008712 A1 * | 1/2002 | Shigeta | ......................... | 345/690 |
| 2005/0088625 A1 | 4/2005 | Imade | | |
| 2006/0158566 A1 * | 7/2006 | Sugiyama | ..................... | 348/656 |

FOREIGN PATENT DOCUMENTS

| | | |
|---|---|---|
| JP | 2000-075406 | 3/2000 |
| JP | 2002-287250 A | 10/2002 |
| JP | 2004-317557 | 11/2004 |
| JP | 2005-134482 | 5/2005 |
| JP | 2006-184568 | 7/2006 |
| JP | 2006-235073 A | 9/2006 |

OTHER PUBLICATIONS

International Search Report: PCT/JP2007/068110 filed Sep. 19, 2007.
JP Office Action dtd Jul. 26, 2011, JP Application No. 2006-261404; English Translation.

* cited by examiner

*Primary Examiner* — William C Dowling
(74) *Attorney, Agent, or Firm* — Banner & Witcoff, Ltd.

(57) ABSTRACT

A field-sequential-type image forming device which includes: a light valve element which divides one field of a color image to sectors corresponding to primary colors different from each other and forms images corresponding to the primary colors during periods of the respective sectors; a light emission control unit which controls light emission quantities of the light sources; and an image control signal outputting unit which outputs control signals to the light valve element. In such an image forming device, the image control signal outputting unit outputs signals for forming the image by controlling light quantities of lights emitted from the primary color light sources during the primary color light emission period and light quantity correction signals for controlling light quantity of the image corresponding to the positions of the pixels which form the image during the high-brightness light emission period.

15 Claims, 4 Drawing Sheets

Fig. 4

IMAGE FORMING DEVICE

CROSS-REFERENCE TO RELATED APPLICATION(S)

The present application is a Continuation-in-Part of International Application PCT/JP2007/068110 filed on Sep. 19, 2007, which claims the benefits of Japanese Patent Application No. 2006-261404 filed on Sep. 26, 2006.

BACKGROUND

1. Field

The present invention relates to an image forming device which forms a color image by temporal color mixing, and more particularly to an image forming device which can reduce brightness irregularities in an image.

2. Description of the Related Art

Conventionally, there has been known an image projection device capable of performing a projection display of an extremely bright image without deteriorating color distribution of a displayed image (See JP-A-2005-134482 (patent document 1), FIG. 3).

According to the image projection device described in JP-A-2005-134482 (patent document 1, FIG. 3), an extremely bright display image can be acquired by firstly emitting lights of at least two colors out of lights of colors of R, G, B so as to acquire illumination lights of predetermined colors and, thereafter, by emitting lights of all colors R, G, B to acquire a white illumination light. Further, as shown in FIG. 3 of the patent document 1, there is also disclosed a technique in which desired illumination light quantities are acquired by controlling light emission intensity and light emission time using four sequences including a sequence for acquiring white illumination light by emitting lights of all colors of R,G,B.

SUMMARY

The image projection device of patent document 1, however, was invented with the intention of brightening the whole image and hence, there exists a drawback that light quantity of a specific portion such as a periphery of a projected image cannot be easily increased.

The present invention has been made to overcome the above-mentioned drawback, and it is an object of the present invention to provide an image forming device which can project an easily viewable image by making brightness of an image uniform over the whole surface of a projected image, wherein additional lights of high brightnesses are projected on pixels at portions of the image which are liable to be projected darkly in general such as corners of the projected image, for example.

According to one aspect of the present invention, there is provided an image forming device which includes: a light valve element which is configured to divide one field of a color image to sectors corresponding to primary colors different from each other and is configured to form an image corresponding to each primary color during a period of each sector; light sources which are configured to irradiate lights of the primary colors to the light valve element during the periods of the respective sectors; a light emission control unit which is configured to output light emission signals corresponding to the light sources for controlling light emission quantities of the light sources; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which the light source is made to sequentially emit light of the primary color by time division and a high-brightness light emission period in which the light source is made to emit light of other primary color during the primary color light emission period, and each control signal which is outputted by the image control signal outputting unit includes a signal for forming the image by controlling light quantity of light emitted from the primary color light source during the primary color light emission period and a light quantity correction signal for controlling light quantity of the image corresponding to a position of a pixel which forms the image during the high-brightness light emission period.

DETAILED DESCRIPTION

One preferred embodiment of the present invention is explained hereinafter in conjunction with attached drawings.

Figure 1:
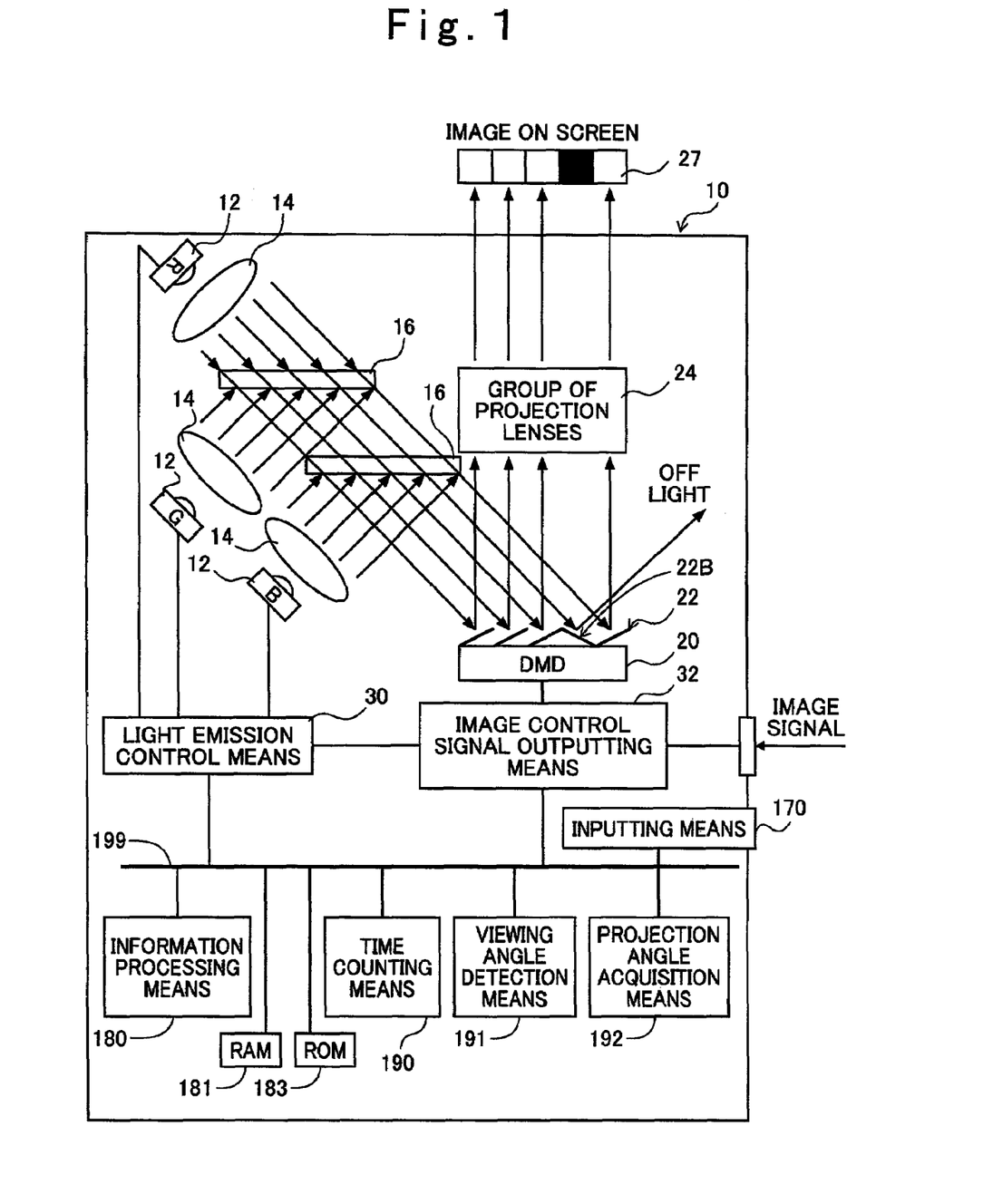
FIG. 1 is a block diagram showing the internal constitution of a projection device which constitutes one embodiment of an image forming device according to the present invention.

FIG. 1 is a block diagram showing the internal constitution of a projection device which constitutes one form of an image forming device according to the present invention.

The projection device of this embodiment is configured such that a light valve element forms an image using light emitted from light sources, and projects the formed image on a projection surface (screen) in such a manner that a viewer can easily view the image.

The projection device 10 shown in FIG. 1 includes light sources 12 of a plurality of colors which can control light emission periods thereof independently from each other, condensing lenses 14 which converge diffused lights which the respective light sources 12 emit and radiate the more uniform illumination lights to a light valve element 20, dichroic mirrors 16 which allow lights having predetermined wavelengths to pass therethrough and, at the same time, reflect lights having specific wavelengths and synthesize lights having a plurality of wavelengths, the light valve element 20 which allows the lights to be incident on a group of projection lenses 24 by tilting the movable mirrors 22 which are provided for respective pixels thus forming an image, and a group of projection lenses 24 which project the image formed by the light valve element 20 on a screen 26.

The projection device 10 also includes a light emission control unit 30 which outputs light emission signals to the light sources 12 for making the light sources 12 sequentially emit lights of a plurality of primary colors by time division, an image control signal outputting unit 32 which outputs control signals for controlling the tilting of the mirrors 22 of the light valve elements 20 upon inputting of the image signals to the image control signal outputting unit 32, and an inputting unit 170 which is constituted of switches, cursor button switches and the like which allow a user to input various information, and an information processing unit 180 which controls the whole of the projection device 10.

Figure 3:
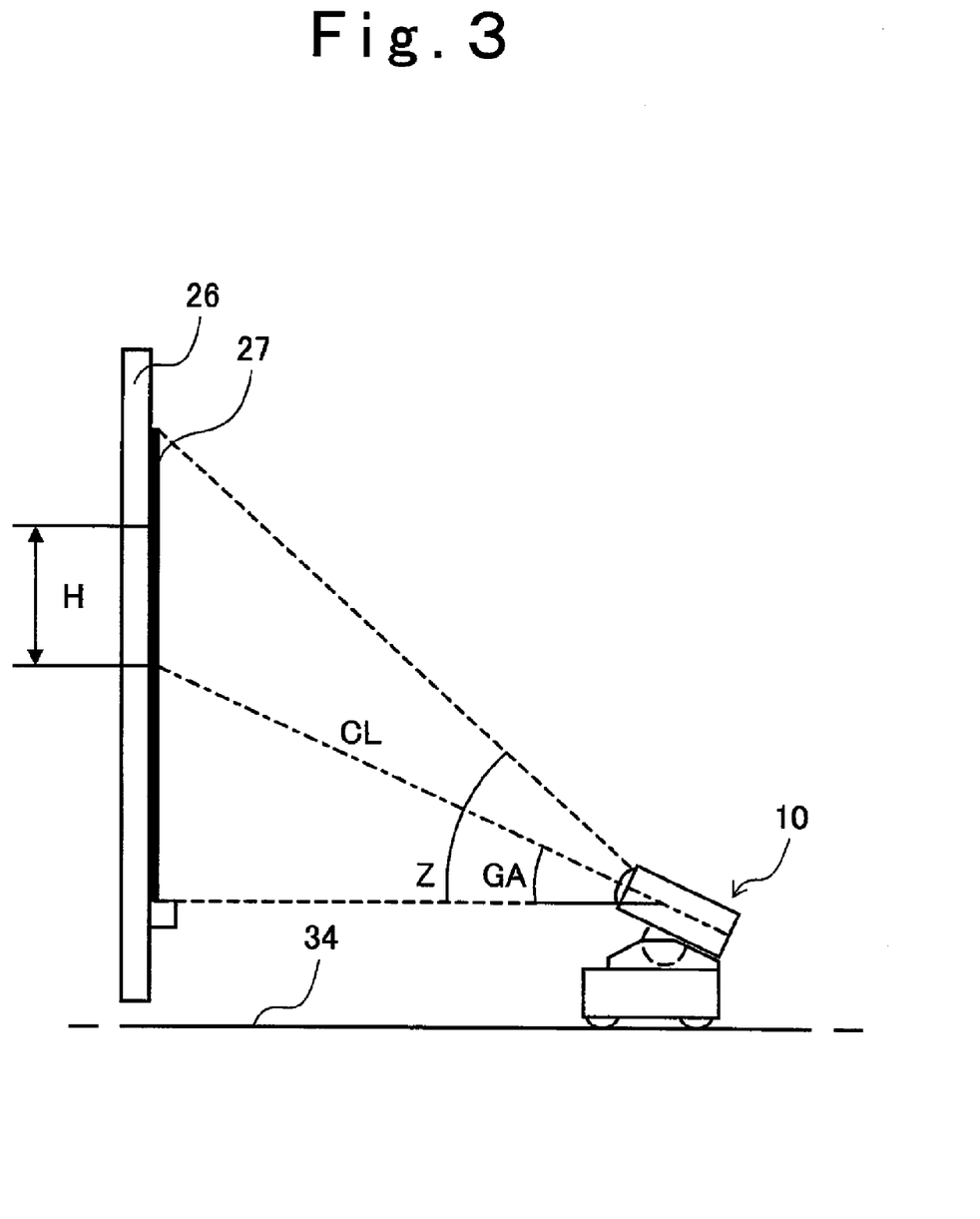
FIG. 3 is a view showing a state in which an image is projected at a predetermined projection angle with respect to a line normal to a screen.

The projection device 10 also includes a RAM (Random Access Memory) 181 which the information processing unit 180 uses as a working area at the time of executing processing, a ROM (Read Only Memory) 183 which records processing programs to be executed by the information processing unit 180 and various other information such as constants, a time counting unit 190 which counts times, a viewing angle detection unit 191 which detects viewing angles of the image which a group of projection lenses 24 projects, and a projection angle acquiring unit 192 which acquires a projection angle GA of the image which the projection device 10 projects in a vertical direction (see FIG. 3).

The respective peripheral circuits in the projection device 10 including the information processing unit 180, the light emission control unit 30, the image control signal outputting unit 32, the RAM 181, the ROM 183, the time counting unit 190, the viewing angle detection unit 191 and the projection angle acquiring unit 192 and the like are connected with each other via a bus 199, and the respective peripheral circuits are controlled based on the processing programs executed by the information processing unit 180. Here, the processing program executed by the information processing unit 180 may be provided using a storage medium or a communication means. Further, the respective peripheral circuits may be constituted of ASIC (Application Specific Integrated Circuit) or the like.

The light emission control unit 30 outputs light emission signals which have a primary color light emission period in which the light sources 12 are made to sequentially emit lights of primary colors of the image during a period of one field by time division and a high-brightness light emission period in which light sources 12 of a plurality of primary colors are made to emit lights to the light sources 12.

The image control signal outputting unit 32 has a function of outputting the image forming signals for controlling quantities of radiation lights for respective pixels based on the image signals to the light valve element 20 during the primary color light emission periods in which the light sources 12 emit lights of primary colors. For example, as shown in FIG. 1, when only a pixel corresponding to a mirror 22B is set in an OFF state in the field of one image, so-called OFF light is not incident on the group of projection lenses 24. Accordingly, with respect to an image 27 projected on the screen 26, only a portion of the image relating to the pixel corresponding to the mirror 22B becomes dark and hence, the image having a contrast can be formed. Here, gradation of the image is expressed using temporal color mixing by controlling a time in which the mirror 22 is turned on.

Further, the image control signal outputting unit 32 has a function of outputting light quantity correction signals for controlling quantities of radiation lights corresponding to the positions of the pixels in the light valve element 20 to the light valve element 20 during the high-brightness light emission period in which light sources 12 of a plurality of primary colors emit lights. By allowing the image control signal outputting unit 32 to output the light quantity correction signals for controlling the quantities of radiation lights corresponding to the positions of the pixels of the light valve element 20, it is possible to project additional lights of high-brightness to corner portions of the image 27 which are liable to be darkly projected in general. Due to such an operation, it is possible to make the brightness of the image 27 uniform thus making the image 27 more easily viewable.

Figure 2:
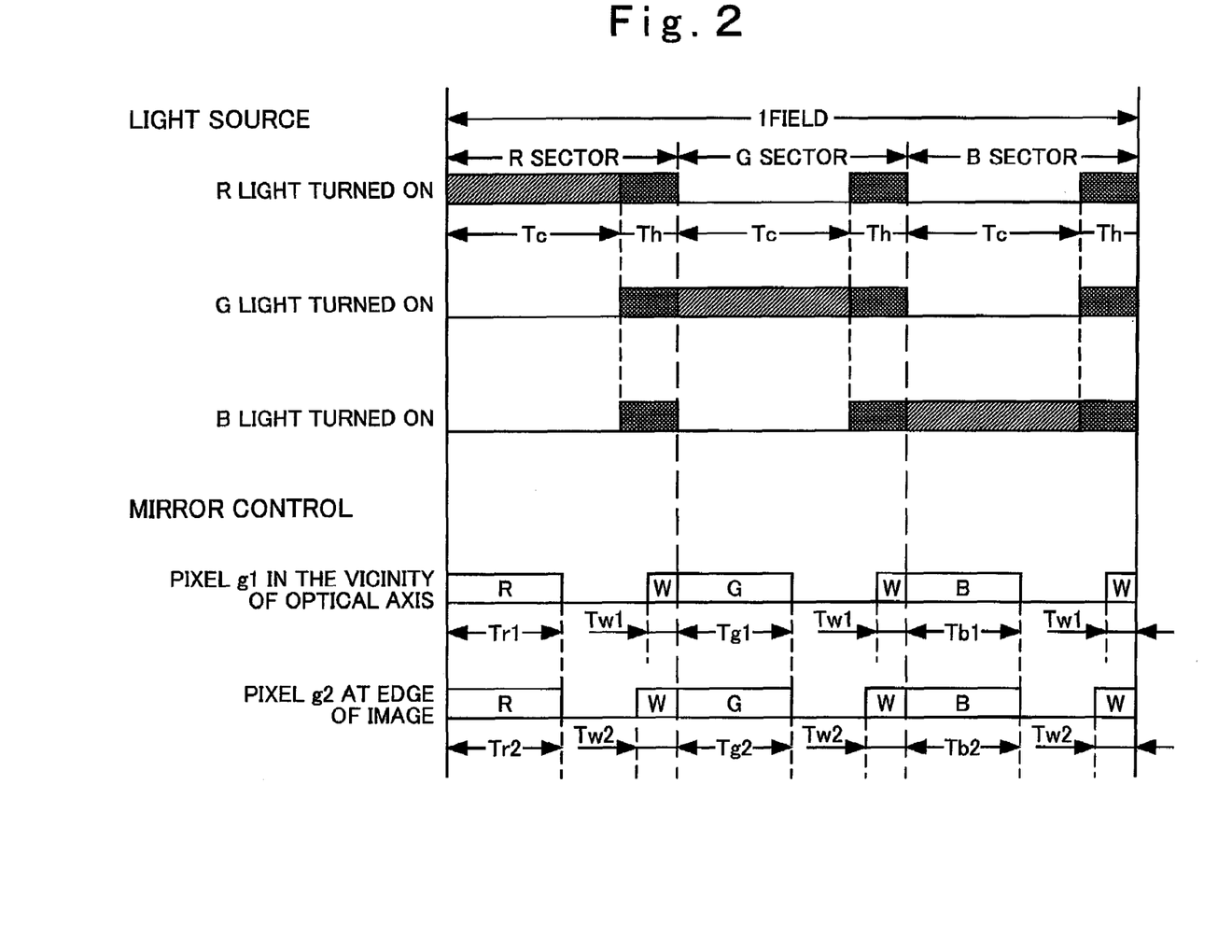
FIG. 2 is a timing chart showing timing of image forming signals Tr during a primary color light emission period Tc and timing of light quantity correction signals Tw during a high-brightness light emission period Th.

FIG. 2 is a timing chart which shows timing at which image forming signals Tr are generated in the primary color light emission period Tc and timing at which light quantity correction signals Tw are generated in the high-brightness light emission period Th.

In the embodiment shown in FIG. 2, there is shown so-called field-sequential-type timing in which one field of the image is divided into an R sector which forms a red image, a G sector which forms a green image and a B sector which forms a blue image, and the formed images of respective colors are subject to temporal color mixing thus forming a color image.

In the embodiment shown in FIG. 2, each sector has the primary color light emission period Tc in which the light sources 12 of respective primary colors consisting of R, G, B sequentially emit lights by time division such that the lights do not overlap with each other, and the high-brightness light emission period Th in which the light sources 12 of a plurality of primary colors out of the primary colors consisting of R, G, B emit lights.

For example, in the primary color light emission period Tc of the R sector, the image control signal outputting unit 32 outputs the image forming signal for controlling light quantities of radiation lights for every pixel to the light valve element 20 for forming the image of red color. In general, the light valve element 20 form pixels using one million or more mirrors, and performs a gradation expression by changing times of video generation signals Tr for projecting lights for the respective pixels.

For example, assume that one pixel which forms the image in the vicinity of the optical axis is designated as g1, and the mirror 22 is turned on during a period of the image forming signal Tr1 during the primary color light emission period Tc of the R sector so that the light emitted from the red light source 12 is incident on the group of projection lenses 24 and is projected on the screen 26. Further, assume that another pixel which forms the image at an edge of the image remote from the optical axis is designated as g2, and the mirror 22 is turned on during a period of the image forming signal Tr2 during the primary color light emission period Tc of the R sector so that the light emitted from the red light source 12 is incident on the group of projection lenses 24 and is projected on the screen 26.

In the embodiment shown in FIG. 2, after the primary color light emission period Tc of the R sector is finished, the high-brightness light emission period Th in which light sources 12 emit lights of three colors consisting of red, green and blue is provided. In the example shown in FIG. 2, assuming an ON time of the mirror 22 of the pixel g1 during the high-brightness light emission period Th as a period of a light quantity correction signal Tw1 and an ON time of the mirror 22 of the pixel g2 as a period of a light quantity correction signal Tw2, the period of the light quantity correction signal Tw2 is set longer than the period of the light quantity correction signal Tw1. Accordingly, the ON time of mirror 22 of the pixel g2 at the edge of the image can be set longer thus increasing a light quantity in the vicinity of an edge of the image. The reason that the period of light quantity correction signal Tw1 is also provided to the pixel g1 in the vicinity of the optical axis which is relatively bright as the ON time of the mirrors 22 is that, when light emitting diodes which are liable to exhibit insufficient light emission quantity are used as the light sources 12, for example, such a period of light quantity correction signal Tw can compensate for the insufficient light quantity thus making the whole image bright.

Further, in the embodiment shown in FIG. 2, the high-brightness light emission periods Th are provided immediately before and after each primary color light emission period Tc of R, G, B. By providing the high-brightness light emission period Th immediately before and after each high-brightness light emission period Th, it is possible to allow the respective mirrors 22 to continue an ON state during the light emission periods corresponding to the image forming signal Tr and the light quantity correction signals Tw, the image forming signal Tg and the light quantity correction signals Tw, and the image forming signal Tb and the light quantity correction signals Tw. Accordingly, an ON-OFF control of the mirrors 22 can be facilitated while increasing the light quantities. Further, by distributing the high-brightness light emission period Th into the R sector, the G sector and the B sector, quantities of lights emitted from the light sources 12 can be increased while suppressing the elevation of temperatures of the light sources 12.

Further, in the embodiment shown in FIG. 2, by providing the adjacent primary color light emission period Tc immediately after the high-brightness light emission period Th, it is possible to continuously output the light quantity correction signal and the signal for forming the image to the light valve element 20. By controlling the light valve element 20 such that the light quantity correction signal and the signal for forming the image are continuously outputted to the light valve element 20, an unnecessary control of the light valve element 20 can be omitted. Further, the emitted light quantities can be increased. Still further, even when the number of pixels of the light valve element 20 is large, a time necessary for 1 field can be made relatively short.

In the embodiment shown in FIG. 2, in the pixel g1 and the pixel g2, the mirrors 22 are turned on only within the time of the same image forming signal Tr. In general, vignetting is found in the group of projection lenses 24, and even when such vignetting is eliminated, lowering of quantity of light at a periphery of a projected image attributed to a projection angle GA (see FIG. 3) is observed. Accordingly, there is a tendency that an image which the pixel g2 at an edge of the image forms is darker than an image which the pixel g2 in the vicinity of the optical axis forms.

Accordingly, in the embodiment of the present invention, separate from the primary color light emission period Tc in which the color image is formed, the high-brightness light emission period Th in which the light sources 12 of a plurality of primary colors are allowed to emit lights is provided, and during such a high-brightness light emission period Th, the light quantity correction signals Tw for controlling the quantities of radiation lights corresponding to positions of the pixels in the light valve element 20 are outputted to the light valve element 20. Due to such an operation, it is possible to project additional lights to corner portions of the projected image which are liable to be darkly projected corresponding to distances from the optical axis. Accordingly, the brightness of the projection image is made uniform thus forming an easily viewable image.

In the above-mentioned embodiment, the explanation has been made with respect to the case in which the lights of all colors are emitted in respective color periods of the high-brightness light emission period Th. However, it is not always necessary to emit lights of all colors in respective color periods of the high-brightness light emission period Th. For example, the blue light and the green light may be emitted during the red period (R sector), the green light and the red light may be emitted during the blue period (B sector), and the red light and the blue light may be emitted during the green period (G sector) thus adding white to the projected image by temporal color mixing when viewed as the whole 1 field period.

In this embodiment, the explanation has been made with respect to the case in which one sheet of still image which constitutes the image is set as a field. However, a concept of field does not exist when an image is formed using a non-interlace-type image signal and hence, it is reasonable to consider that a frame generally used corresponds to a field in this case. Here, In case of an interlace-type image signal used in TV broadcasting or the like, two fields constitute one frame in general.

Next, the correction of lowering of peripheral light quantity attributed to a viewing angle Z or a projection angle GA of the projected image is explained in conjunction with FIG. 3.

FIG. 3 shows a state in which the image 27 is projected at a predetermined projection angle GA with respect to a line normal to the screen 26.

As shown in FIG. 3, attributed to a magnitude of the projection angle GA and a magnitude of the viewing angle Z, the peripheral light quantity of the image 27 projected by the projection device 10 is lowered. Accordingly, the embodiment of the present invention includes a viewing angle detection unit 191 which detects a viewing angle Z and a projection angle acquiring unit 192 which detects the projection angle GA. Due to such constitution, by controlling quantities of radiation lights from the light valve element 20 corresponding to positions of the pixels of the light valve element 20, even when an angular difference between the line normal to the screen and the projection angle GA is increased, it is possible to make the brightness of the image 27 projected on the whole surface of the screen 26 uniform thus enabling the projection of the easily viewable image. Further, as shown in FIG. 3, radiation light quantities may be controlled corresponding to a height H from the optical axis CL or the radiation light quantities may be controlled concentrically corresponding to distances from the optical axis CL.

When the group of projection lenses 24 is formed of a projection lens having the fixed magnification, the viewing angle Z is a fixed value and hence, a relationship between distances from the optical axis CL and the brightnesses of images at the positions is preliminarily obtained, and a correction map of light quantities which enables the acquisition of more uniform brightness is stored in the ROM 183 as a position light quantity table. Then, in projecting an image, in the high-brightness light emission period of each sector, the light quantity correction signals corresponding to the distances from the optical axis CL are acquired from the ROM 183, and the image control signal outputting unit 32 outputs the light quantity correction signals Tw (ON times of the mirrors 22) to the light valve element 20 for respective pixels.

Further, when the group of projection lenses 24a is formed using zooming lenses, a relationship between the viewing angles (magnifications) and the brightnesses of the respective pixels of the image is preliminarily acquired, and correction maps of light quantities which enables the acquisition of the more uniform brightness are stored in the ROM 183 as a position light quantity table. Then, in projecting the image, during the high-brightness light emission period of each sector, the light quantity correction signals corresponding to the viewing angles of the zooming lenses are acquired from the ROM 183, and the image control signal outputting unit 32 outputs the light quantity correction signals Tw (ON times of the mirrors 22) for respective pixels to the light valve element 20. In the drawing, numeral 34 indicates a mounting surface on which the projection device 10 is mounted.

Next, a method of generating light quantity correction signals corresponding to brightnesses of an image is explained.

When only the correction of quantity of peripheral light is performed with the image in a dark state, there exists a possibility that a portion of the image at the center of the image becomes dark and a portion of the image at a periphery of the image is corrected to become bright. Accordingly, in this embodiment, the image control signal outputting unit 32 may be configured such that the image control signal outputting unit 32 calculates brightnesses in one or a plurality of fields upon inputting of image signals, multiplies the calculated brightnesses (%) in one or a plurality of fields with light quantity correction signals corresponding to positions of the pixels thus generating new light quantity correction signals Tw (ON times of the mirrors 22), and outputs the new light quantity correction signals Tw to the light valve element 20. Due to such an operation, the brightness can be made uniform over the whole projected image thus enabling the projection of the easily viewable image.

Further, the image control signal outputting unit 32 may be configured such that the image control signal outputting unit 32 calculates an average value of brightnesses of one or a plurality of fields of an image in place of the brightness of one or a plurality of fields, multiplies the calculated average value of brightness (%) in one or a plurality of fields with light quantity correction signals corresponding to positions of the pixels thus generating new light quantity correction signals Tw (ON times of the mirrors 22), and outputs the new light quantity correction signals Tw to the light valve element 20.

Next, a method of changing the high-brightness light emission period Th is explained.

In the embodiment shown in FIG. 2, the ON time of the light quantity correction signal Tw (ON time of the mirror 22) of the pixel g2 at the edge of the image is set shorter than the high-brightness light emission period Th. When the ON time of the light quantity correction signal Tw (ON time of the mirror 22) is set shorter than the high-brightness light emission period Th in all pixels, there exists a period in which actually emitting light is not used. This implies that the light sources 12 emit the lights wastefully during such a period.

To prevent such wasteful light emission, the light emission control unit 30 may be configured to perform a control such that the light emission control unit 30 receives inputting image signals, acquires brightnesses in one field or a plurality of fields of the image, and allows the light sources 12 of a plurality of primary colors to emit lights with the acquired light emission quantities which bring about the maximum brightnesses in one or a plurality of fields of the image. Further, the light emission control unit 30 may be configured to perform a control such that the light emission control unit 30 acquires an average value of brightnesses in one or a plurality of fields of an image and allows the light sources 12 of a plurality of primary colors to emit light with light emission quantities corresponding to the acquired average value of brightnesses.

Figure 4:
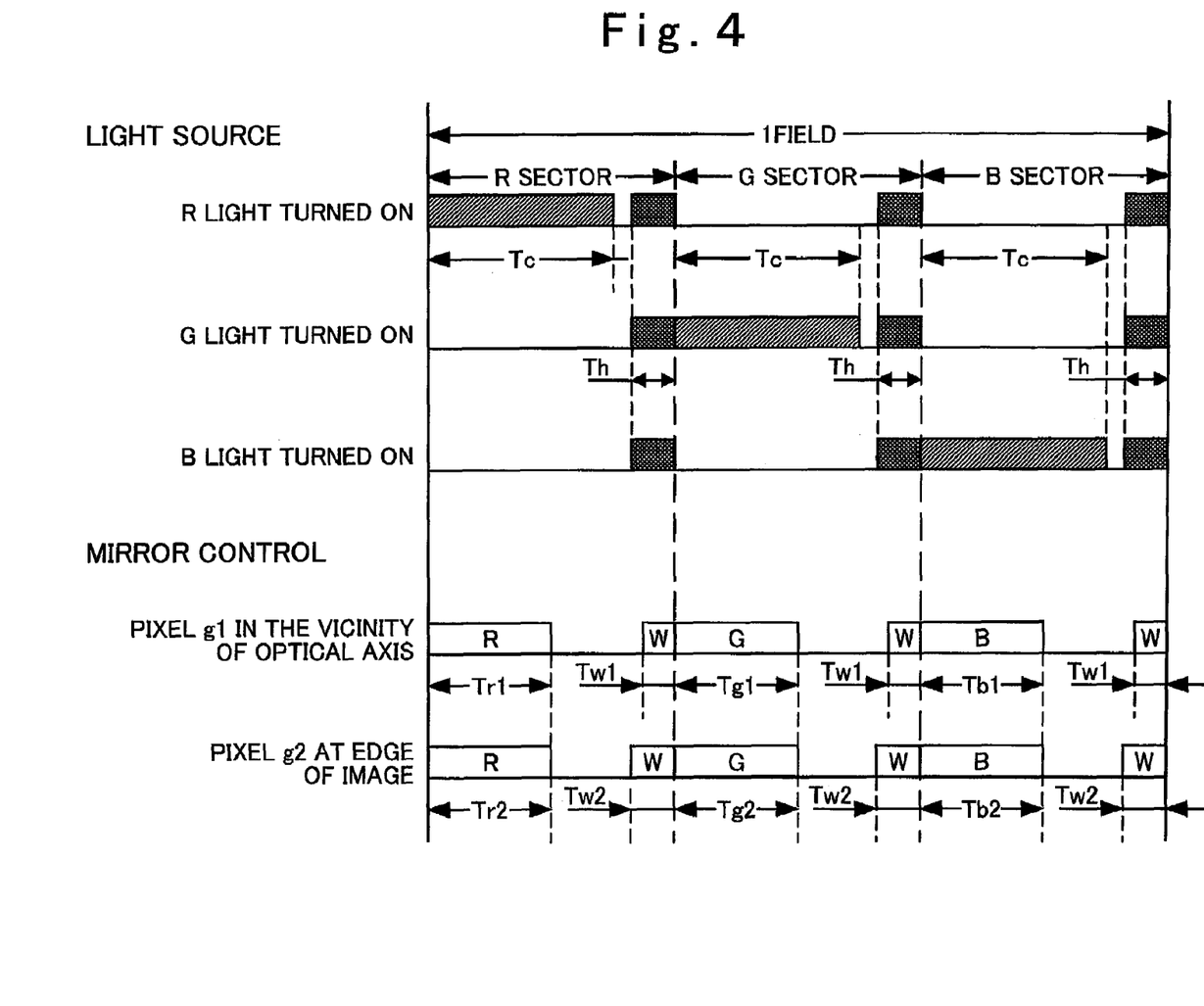
FIG. 4 is a timing chart showing an embodiment in which a control which allows light sources to emit lights of a plurality of primary colors with light emission quantities corresponding to brightnesses in one or a plurality of fields of an image is performed.

FIG. 4 is a timing chart showing an embodiment in which the light emission control unit 30 performs a control such that the light emission control unit 30 acquires brightnesses in one field or a plurality of fields of the image and allows the light sources 12 of a plurality of primary colors to emit light with light emission quantities corresponding to the brightnesses.

In the embodiment shown in FIG. 4, to acquire the light emission quantities corresponding to the brightnesses in one or a plurality of fields of the image, the light emission control unit 30 performs a control for changing, that is, shortening the high-brightness light emission period Th corresponding to brightnesses of one or a plurality of fields of the image.

Besides the control shown in FIG. 4 which shortens the high-brightness light emission period Th, for example, the light emission quantities may be controlled by controlling electric currents supplied to the light sources 12, for example. Further, by controlling both of the high-brightness light emission period Th and the electric currents, the light emission quantities of the light sources 12 may be controlled.

Further, the correction of the light emission quantities may be performed such that a brightness light quantity table which records the relationship between brightnesses in one or a plurality of fields of the image or the average value of the brightnesses and the light emission quantities of the respective light sources 12 is preliminarily stored in the ROM 183 or the like, the light emission control unit 30 acquires the light emission quantities by reference to the brightness light quantity table, and controls the emission of lights of a plurality of primary colors based on the acquired light emission quantities.

Next, a method of generating light quantity correction signals corresponding to hues of the image is explained.

When irregularities are present in the hue of the whole image, in correcting the peripheral light quantity with white, there may be a case that the hue in the vicinity of the center of the image 27 and the hue in a periphery of the image largely differ from each other. To prevent such a drawback, the image control signal outputting unit 32 may, upon inputting of the image signals to the image control signal outputting unit 32, calculate hues in one or a plurality of fields of the image, and perform a control of light emission quantities of the light sources 12 of a plurality of primary colors with light emission quantities corresponding to the calculated hues in one or a plurality of fields. In this manner, by adjusting and combining the light emission quantities of a plurality of primary colors, the whole surface of projected image can acquire balanced hues thus realizing the projection of an easily viewable image. That is, in FIG. 4, the high-brightness light emission period Th of lights of all colors have the same length of time, the high-brightness light emission period Th may differ in length of time for respective colors. Further, depending on a hue to be displayed, the high-brightness light emission period Th of a certain color may be set to 0.

Further, an average value of hues in one or a plurality of fields of the image may be calculated, and the light emission quantities of the light sources 12 of a plurality of primary colors may be controlled with light emission quantities corresponding to the calculated average hue in one or a plurality of fields of the image.

Further, the correction of light emission quantities may be performed such that a tone light quantity table which preliminarily records a relationship between the hues in one or a plurality of fields of the image or an average value of the hues and the light emission quantities of the respective light sources to be controlled is preliminarily stored in the ROM 183 or the like, and the light emission control unit 30 acquires light emission quantities by reference to the tone light quantity table and controls the emission of lights of a plurality of primary colors.

The invention claimed is:

1. An image forming device comprising:
a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, and each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is configured to acquire the light quantity correction signals from a position light quantity storage which records a relationship between positions of the pixels and the light quantity correction signals, and outputs the light quantity correction signals to the light valve element.

2. An image forming device according to claim 1, wherein the light emission control unit is configured to acquire light emission quantities in the form of the brightnesses in one or a plurality of fields of the image upon inputting of the image signals to the light emission control unit, and allow the light sources of a plurality of primary colors to simultaneously emit the acquired light emission quantities in one or the plurality of fields of the image.

3. An image forming device according to claim 1, wherein the light emission control unit is configured to acquire an average value of brightnesses in one or a plurality of fields of the image upon inputting of the image signals to the light emission control unit, and allow the light sources of a plurality of primary colors to simultaneously emit light emission quantities based on the average value of brightnesses in one or the plurality of fields of the image.

4. An image forming device according to claim 1, wherein the light emission control unit is configured to acquire light emission quantities in the form of hues of one or a plurality of fields of the image upon inputting of the image signals to the light emission control unit, and is configured to control light emission quantities of the plurality of primary colors with the acquired light emission quantities.

5. An image forming device according to claim 1, wherein the light emission control unit is configured to acquire an average value of hues in one or a plurality of fields of the image upon inputting of the image signals to the light emission control unit, and is configured to control light emission quantities of a plurality of primary colors with light emission quantities based on the acquired average value of the hues.

6. An image forming device according to claim 1, wherein the image control signal outputting unit is configured to continuously output the signals for forming the image by controlling the light quantities of lights emitted by the primary color light sources in the primary color light emission period and the light quantity correction signals to the light valve element.

7. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is further configured to
calculate brightnesses in one or a plurality of fields of the image upon inputting of the image signals to the image control signal outputting unit, and
output the light quantity correction signals to the light valve element based on the calculated brightnesses and the positions of the pixels of the light valve element.

8. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is further configured to
calculate an average value of brightnesses in one or a plurality of fields of the image upon inputting of the image signals to the image control signal outputting unit, and
output the light quantity correction signal to the light valve element based on the calculated average value of brightnesses and the positions of the pixels of the light valve element.

9. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors;

an image control signal outputting unit which is configured to receive inputting image signals and is configured to output control signals to the light valve element, the image forming device being configured to form the color image by temporal color mixing and being configured to make brightness within the color image more uniform, and a group of projection lenses which are configured to project the image formed by the light valve element on a screen, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is, with respect to the image at a position arranged away from an optical axis of the group of projection lenses, configured to
acquire the light quantity correction signals from a position light quantity storage which records a relationship between distances from the optical axis and brightnesses of the image at the positions of the pixels, and
output the light quantity correction signal based on a distance from the optical axis.

10. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors;

an image control signal outputting unit which is configured to receive inputting image signals and is configured to output control signals to the light valve element, the image forming device being configured to form the color image by temporal color mixing and being configured to make brightness within the color image more uniform;

a group of projection lenses which is configured to project the image formed by the light valve element onto a screen at a projection angle; and a projection angle acquiring unit which is configured to acquire the projection angle, wherein the image control signal outputting unit is configured to output the light quantity correction signal to the light valve element based on the projection angle, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, and wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period.

11. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, wherein the light emission control unit is configured to acquire light emission quantities in the form of the brightnesses in one or a plurality of fields of the image upon inputting of the image signals to the light emission control unit, and allow the light sources of a plurality of primary colors to simultaneously emit the acquired light emission quantities in one or the plurality of fields of the image, and wherein the light emission control unit is configured to acquire light emission quantities from a brightness light quantity storage which records a relationship between brightnesses in one or the plurality of fields of the image or the average value of brightness and the light emission quantities to be controlled, and is configured to allow the lights sources to simultaneously emit the lights of plurality of primary colors based on the acquired light emission quantities.

12. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, wherein the light emission control unit is configured to acquire light emission quantities in the form of hues of one or a plurality of fields of the image upon inputting of the image signals to the light emission control unit, and is configured to control light emission quantities of the plurality of primary colors with the acquired light emission quantities, and wherein the light emission control unit is configured to acquire light emission quantities of the light sources from a tone light quantity storage which records a relationship between hues in one or a plurality of fields of the image or the average value of the hues of the image and the light emission quantities to be controlled, and is configured to perform a control of allowing the light sources to emit lights.

13. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is configured to calculate brightnesses in one or a plurality of fields of the image upon inputting of the image signals to the image control signal outputting unit, multiply the calculated brightnesses in the one or a plurality of fields with the light quantity correction signals based on positions of the pixels to generate new light quantity correction signals, and output the new light quantity correction signals to the light valve element.

14. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors; and an image control signal outputting unit which is configured to receive inputting image signals and is configured to output control signals to the light valve element, the image forming device being configured to form the color image by temporal color mixing and being configured to make brightness within the color image more uniform, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is configured to calculate an average value of brightnesses in one or a plurality of fields of the image upon inputting of the image signals to the image control signal outputting unit, multiply the calculated average value of brightness in the one or a plurality of fields with the light quantity correction signals based on positions of the pixels to generate new light quantity correction signals, and output the new light quantity correction signals to the light valve element.

15. An image forming device comprising:

a light valve element which is configured to divide one field of a color image to sectors corresponding to primary colors different from each other and is configured to form an image corresponding to each primary color during a period of each sector;

light sources which are configured to irradiate lights of the primary colors to the light valve element during the periods of the respective sectors;

a light emission control unit which is configured to output light emission signals to the light sources for controlling light emission quantities of the light sources and for controlling the light sources to sequentially emit light of the primary colors by time division during the periods of the respective sectors;

an image control signal outputting unit which is configured to receive inputting image signals and is configured to output control signals to the light valve element, the image forming device being configured to form the color image by temporal color mixing and being configured to make brightness within the color image more uniform; and a group of projection lenses which are configured to project the image formed by the light valve element on a screen, wherein each light emission signal which the light emission control unit outputs has, during a period of said one field, a primary color light emission period in which one of the light sources is made to emit light of its corresponding primary color and a high-brightness light emission period in which the light sources are made to emit light of their corresponding primary color, wherein each control signal which is outputted by the image control signal outputting unit includes a signal for forming the image by controlling light quantity of light emitted from the primary color light source during the primary color light emission period and a light quantity correction signal for correcting light quantity of the image based on a position of a pixel in the light valve element during the high-brightness light emission period, and wherein the image control signal outputting unit is, with respect to the image at a position arranged away from an optical axis of the group of projection lenses, configured to acquire the light quantity correction signals from a position light quantity storage which records a relationship between distances from the optical axis and brightnesses of the image at the positions of the pixels, and output the light quantity correction signal based on a distance from the optical axis.

* * * * *